Patented Feb. 10, 1953

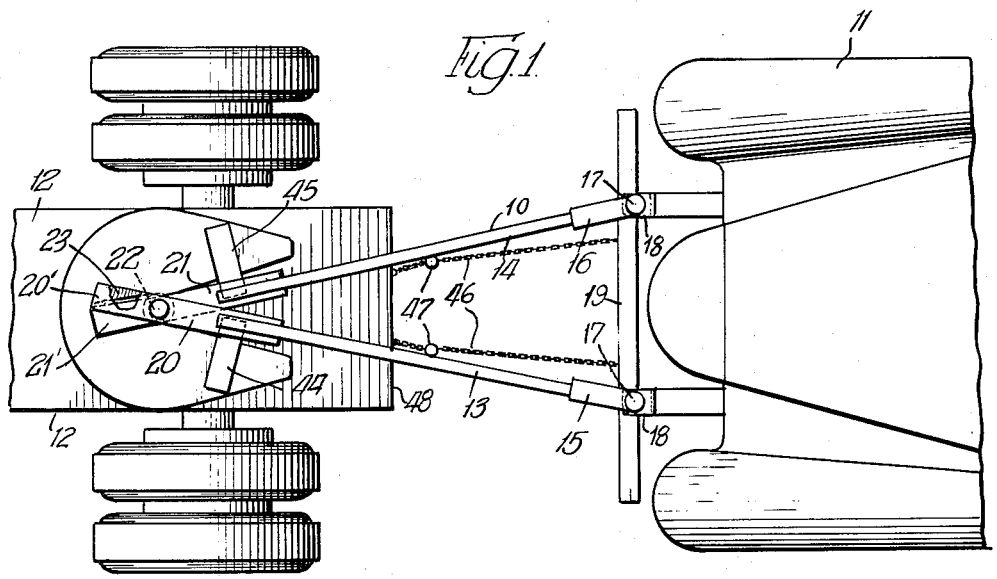
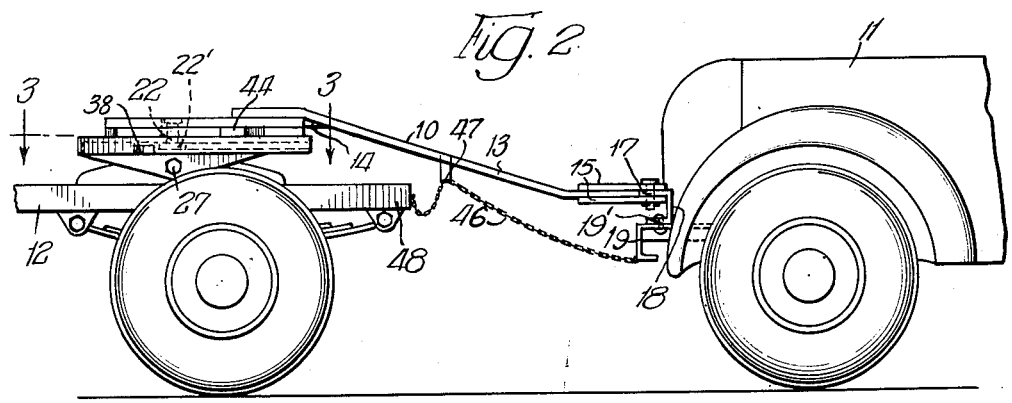
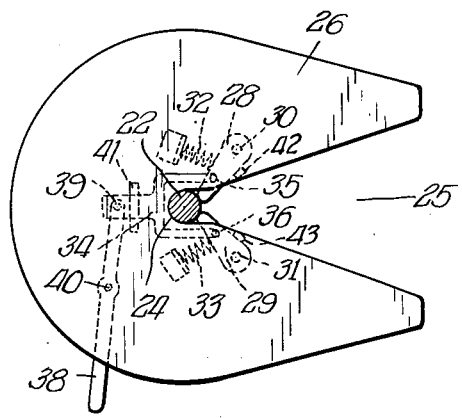

2,628,107

UNITED STATES PATENT OFFICE 2,628,107

TOW BAR

Paul J. Schlairet, Mount Vernon, Ohio

Application May 26, 1950, Serial No. 164,481

3 Claims. (Cl. 280—33.05)

This invention relates to improvements in towing devices and it is more particularly concerned with a device which is especially adapted for coupling the vehicle being towed with the towing vehicle when the towing vehicle is a power or tractor unit of a tractor-trailer combination type vehicle.

It is a general object of the invention to provide a tow bar for connecting the forward frame structure of the vehicle being towed with the fifth wheel mechanism of the power tractor which constitutes the towing vehicle.

It is a more specific object of the invention to provide a tow bar for coupling a vehicle being towed with the power unit of a combination tractor-trailer which tow bar is characterized by a pair of rigid, pivotally connected, rod members, secured at one end to spaced points on the front bumper or frame structure of the towed vehicle and pivotally connected adjacent the other end with each other and with the fifth wheel of a tractor vehicle, the latter connection employing the same holding or latching mechanism which normally holds the coupling mechanism of the trailer in connected relation with the tractor.

A still further object of the invention is to provide a towing device of the character described of a simple and practical construction, which is strong and reliable in use, which is readily attached to the vehicles, which is easily stored when not in use, and which is relatively inexpensive to manufacture.

These and other objects of the invention will be apparent from a consideration of the device which is shown by way of illustration in the accompanying drawings, wherein:

Fig. 1 is a plan view of a tow bar embodying the principles of the invention, which is positioned in coupling relation between two vehicles, the front and rear portions only of the respective vehicles being shown;

Fig. 2 is a side elevation of the tow bar as shown in Fig. 1; and

Fig. 3 is a section taken generally on the line 3—3 of Fig. 2 and to an enlarged scale.

Referring now to the drawings, there is shown a tow bar construction 10 having incorporated therein the principal features of the invention, the same being shown in coupled relation with a vehicle 11 which is being towed and a tractor vehicle 12 which constitutes the towing vehicle, the front and rear portions only of the respective vehicles being illustrated.

The tow bar 10 comprises a pair of rod-like members 13 and 14 which are each provided at one end with a pair of spaced plates 15, 16 forming a bifurcated end thereon. The bifurcated end formations 15, 16 are identical, each being apertured to receive a removable bolt 17 for pivotally securing the same to a bracket 18 which is apertured to receive the bolt 17. The brackets 18 are in turn secured in laterally spaced relation to a front portion 19 of the frame of the towed vehicle 11, either permanently or detachably, by any conventional securing means such as bolts 19'.

The rod members 13 and 14 are secured adjacent the other end to end plates 20 and 21 which are connected for relative movement in scissors-like fashion. End plate member 20 is arranged to rest on end plate member 21 and the two plates are held in pivoted relation by a connecting pivot bolt 22. A filler plate member 23 is provided on the bottom of end plate 20 adjacent the end 20' thereto for a purpose which will be described.

The connecting pivot bolt 22 is extended and provided with an enlargement or head 22' on the lower side of the lower end plate 21. The connecting bolt or pin 22 is adapted to be received in the end 24 of the V-shaped slot 25 in the bearing plate 26 which constitutes the fifth wheel of the tractor vehicle 12. The fifth wheel plate 26 is hinged to the frame of the vehicle 12 at 27, in a conventional manner, so that it pivots relative to a horizontal plane. The V-shaped slot 25 is normally adapted to receive a depending pin on the coupling mechanism of the trailer which the tractor 12 is designed to pull.

The connecting bolt 22 is held in the slot 25 by the same mechanism which holds the coupling pin on the trailer in connected relation therein. Such mechanism comprises (Fig. 3) a pair of latching arm members 28 and 29 which are pivotally connected to the plate 26 at 30 and 31. Springs 32, 33 are provided which urge the latching arms 28, 29 toward each other to retain the pin 22 in the end 24 of the slot 25. A sliding yoke member 34 which is connected to the arms 28 and 29 at 35 and 36 may be operated to withdraw the latching arms 28 and 29 by the fulcrum arm or handle 38 which is pivoted to yoke 34 at 39 and pivotally connected intermediate its ends at 40 to the bottom of plate 26. The handle member 38 extends laterally of the vehicle and moves the yoke 34 beneath a guide strap member 41. The pivotal connection 39 is arranged to accommodate the radial movement of the end of the operating handle 38. The movement of the latching arms 28, 29 toward each other is limited by stop members 42, 43. The springs 32, 33 yield to permit entry of the pin 22 into the recess 24 when it is moved forwardly in the slot 25.

The rod members 13 and 14 are preferably bent or shaped as shown so that when in coupled relation between the vehicles 11 and 12, with the vehicles on a generally horizontal plane, the fifth wheel plate 26 will be in approximately horizontal position as shown in Fig. 2. A pair of laterally directed plates 44 and 45 are provided on the end plate members 20 and 21 to the rear of pivot bolt 22 which engage the top surface of the fifth wheel 26 and prevent separation or relative movement of the bar or rod members 13 and 14 and the rear end of the fifth wheel plate 26 when the vehicles are supported on different planes as when moving over the crest of a hill. The filler plate 23 and the end 21' on the plates 20 and 21 engage the forward surface of the fifth wheel 26 and prevent separation of the forward portion of the latter and the tow bar when the tendency of plate 26 to tilt is in the other direction. The bar members 13 and 14 are also provided with chain members 46 secured thereto at 47 and connected with a rear frame portion 48 of vehicle 12 and forward frame portion 19 of vehicle 11 to insure that the vehicles 11 and 12 will not be separated if there is any failure of the connection at either end of the tow bar through carelessness in attaching the members. The rod members 13 and 14 are limited in their movement toward each other so that there is sufficient rigidity in the coupling while they may be opened out for coupling with connecting or attaching brackets 18 which may be spaced a greater distance apart than shown on the vehicle 11. The normal angular relation of the bars 13 and 14 and the length of the plates 44 and 45 are such that during all turning movements of the vehicles 11 and 12 the plates 44 and 45 both remain in engagement with the uppermost surface of the fifth wheel 26 and the rods 13 and 14 are thereby prevented from falling down into the V-shaped slot 25 at any time.

While specific details of construction have been shown in the illustrated form of the vehicle, it will be understood that other details of construction may be resorted to within the spirit of the invention.

I claim:

1. A towing device for coupling the front portion of a vehicle being towed and the rear portion of a towing vehicle wherein the towing vehicle is a tractor having a generally horizontal slotted trailer supporting plate on the rear body portion thereof, comprising a pair of bar members, means at one end of said bar members for connecting the same to the vehicle being towed in laterally spaced relation, pivotal means connecting said bar members to each other adjacent the other end, a headed pin extending below said pivotal connecting means, said headed pin being constructed to be positioned in pivotal relation in the slot in the trailer supporting plate of said tractor, latching means on the trailer supporting plate cooperating with the head on said pin for retaining said pin in said slot and abutment means extending on opposite sides of the pivotally connected ends of said bar members for engaging the upper surface of said trailer supporting plate.

2. A tow bar to be used for towing a vehicle by means of a tractor, said tractor having a generally horizontal bearing plate swingably mounted on the body thereof which bearing plate is provided with a rearwardly opening slot and a latching mechanism for retaining a pin in the forward end of said slot, said tow bar comprising a pair of bar members having means for detachably connecting one end thereof with laterally spaced points at the front end of the vehicle being towed, means connecting the other end of said bar members to each other including a pin, said pin having a depending portion adapted to be received in the slot in said bearing plate and to cooperate with said latching means whereby to retain said pin in pivotally connected relation in the slot in said bearing plate, and laterally extending brace plates on said bar members, said brace plates spaced rearwardly from said means for connecting said bar members to each other, said brace plates being arranged for engagement with the top of the bearing plate on the tractor.

3. A tow bar to be used for towing a vehicle by means of a tractor, said tractor having a generally horizontal bearing plate swingably mounted on the body thereof which bearing plate is provided with a rearwardly opening slot and a latching mechanism for retaining a pin in the forward end of said slot, said tow bar comprising a pair of bar members having means for detachably connecting one end thereof with laterally spaced points at the front end of the vehicle being towed, means connecting the other end of said bar members to each other including a pin, said pin having a depending portion adapted to be received in the slot in said bearing plate and to cooperate with said latching means whereby to retain said pin in pivotally connected relation in the slot in said bearing plate, and members forwardly of said means for connecting said bar members to each other for limiting the movement of said bar members relative to said bearing plate.

PAUL J. SCHLAIRET.

REFERENCES CITED

The following references are of record in the file of this patent:

UNITED STATES PATENTS

| Number | Name | Date |
|---|---|---|
| 1,351,245 | Hartwick | Aug. 31, 1920 |
| 2,131,949 | Helmig | Oct. 4, 1938 |
| 2,139,970 | Moore | Dec. 13, 1938 |

FOREIGN PATENTS

| Number | Country | Date |
|---|---|---|
| 577,987 | Germany | June 8, 1933 |